(12) United States Patent
Singh et al.

(10) Patent No.: US 10,154,079 B2
(45) Date of Patent: Dec. 11, 2018

(54) PRE-BOOT FILE TRANSFER SYSTEM

(71) Applicant: Dell Products L.P., Round Rock, TX (US)

(72) Inventors: Ankit Singh, Karnataka (IN); Shekar Babu Suryanarayana, Karnataka (IN); Rohit Kumar Arehalli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 219 days.

(21) Appl. No.: 14/823,800

(22) Filed: Aug. 11, 2015

(65) Prior Publication Data

US 2017/0048304 A1 Feb. 16, 2017

(51) Int. Cl.
  *G06F 15/16* (2006.01)
  *H04L 29/08* (2006.01)
  *H04L 29/06* (2006.01)

(52) U.S. Cl.
  CPC .............. *H04L 67/06* (2013.01); *H04L 67/34* (2013.01); *H04L 69/16* (2013.01); *H04L 69/32* (2013.01); *H04L 69/321* (2013.01)

(58) Field of Classification Search
  CPC .... G06F 9/4416; G06F 21/575; G06F 9/4401; G06F 9/4406; G06F 21/561; G06F 21/562; G06F 8/63; G06F 8/65; G06F 9/4411; G06F 21/572; G06F 13/28; G06F 1/324; G06F 3/0625; G06F 3/0673; G06F 9/546; G06F 15/16; G06F 3/0656; G06F 3/0689; G06F 9/30181; G06F 13/36; G06F 3/0604; G06F 9/5061; G06F 9/5072; G06F 9/5094; G06F 9/545; G06F 9/547; H04L 49/901; H04L 49/90; H04L 69/12; H04L 69/16; H04L 49/9094; H04L 47/10; H04L 67/10; H04L 69/161; H04L 69/162; H04L 29/06; H04L 69/32; H04L 69/22; H04L 45/745;

(Continued)

(56) References Cited

U.S. PATENT DOCUMENTS 5,680,547 A * 10/1997 Chang .................. G06F 9/4416
                                                    709/202
6,014,707 A    1/2000 Miller et al.
(Continued)

OTHER PUBLICATIONS

Shekar Babu Suryanarayana, Ankit Singh and Sumanth Vidyadhara, "Systems and Methods for Efficient File Transfer in a Boot Mode of a Basic Input/Output System," U.S. Appl. No. 14/623,129, filed Feb. 16, 2015, 28 Pages.

(Continued)

*Primary Examiner* — Djenane M Bayard
(74) *Attorney, Agent, or Firm* — Haynes and Boone, LLP

(57) ABSTRACT

A pre-boot file transfer system includes at least one server device that creates a plurality of packets for a file and provides a respective file offset value for each of the plurality of packets in a header of that packet. The at least one server device transmits each of the plurality of packets over a network to a client device that is in a pre-boot environment. The client device receives each of the plurality of packets and stores the plurality of packets in a receive buffer in the order that the plurality of packets were received. The client device then writes the plurality of packets that were stored in the receive buffer into an application buffer in an order that is defined by the respective file offset values for the plurality of packets.

20 Claims, 11 Drawing Sheets

(58) Field of Classification Search
CPC ....... H04L 69/163; H04L 47/50; H04L 67/06; H04L 67/34; H04L 67/42; H04L 41/0806; H04L 61/2015
See application file for complete search history.

(56) References Cited

U.S. PATENT DOCUMENTS

| | | |
|---|---|---|
| 7,617,256 B2 | 11/2009 | Mohamed et al. |
| 7,650,490 B2 * | 1/2010 | Barron, Jr. ............ G06F 9/4416 713/2 |
| 7,813,339 B2 | 10/2010 | Bar-David et al. |
| 2005/0071623 A1 * | 3/2005 | Goud .................... G06F 9/4416 713/100 |
| 2006/0215679 A1 * | 9/2006 | Musoll .................... H04L 49/90 370/412 |
| 2006/0259949 A1 * | 11/2006 | Schaefer ........... G06F 17/30082 726/1 |
| 2015/0082433 A1 * | 3/2015 | Harlacher ........... H04L 63/1425 726/23 |

OTHER PUBLICATIONS

Arjuna Sathiaseelan and Tomasz Radzik, "Improving the Performance of TCP in the Case of Packet Reordering," 18 pages; http://www.cl.cam.ac.uk/~as2330/docs/reorder.pdf.

* cited by examiner

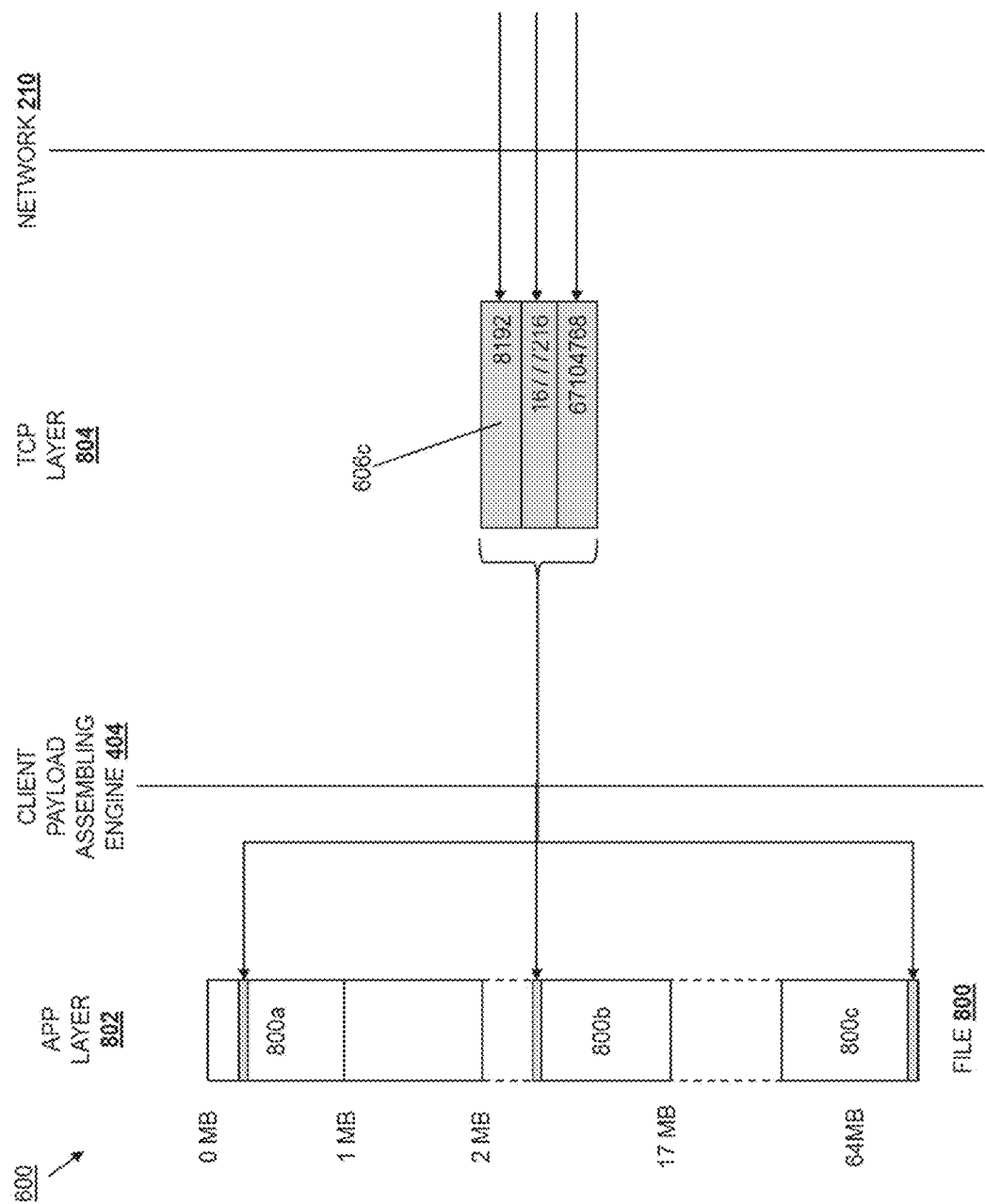

PRE-BOOT FILE TRANSFER SYSTEM

BACKGROUND

The present disclosure relates generally to information handling systems, and more particularly to a file transfer system for information handling systems in a pre-boot environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Prior to booting, information handling systems such as, for example, client devices, may transfer one or more files from server devices in order boot using those files. For example, a client device in a Unified Extensible Firmware Interface (UEFI) pre-boot environment may transfer an operating system (OS) image or firmware update from a server, and subsequently use that OS image to boot, or use that firmware update to update firmware on the client device. Conventionally, the client device and the server device will transfer the OS image using the Transmission Control Protocol (TCP). TCP attempts to provide reliable service to applications by guaranteeing that data that has been transferred remains intact and arrives at the client device in the same order in which it was sent. This is accomplished using TCP features that include the client device rearranging packets according to sequence numbers provided by the server device to ensure ordered data transfer, the client device sending acknowledgements for received packets, and the server device retransmitting missed packets to the client device. Such features raise a number of issues.

For example, packet sequencing by the server device and packet reordering by the client device makes these TCP data transmissions relatively processing heavy. Furthermore, the sending of acknowledgements for received packets and the sending of requests for retransmissions for each missed packet consumes network bandwidth, reducing network throughput as well as overall network performance. Further still, the UEFI pre-boot environment runs in a single threaded mode, which can result in the TCP receive buffer producing a "bottleneck", as that buffer isn't cleared until all packets have been received and ordered. As such, pre-boot operations that involve file transfer to accomplish OS image deployment, firmware updates, and/or other pre-boot file transfers known in the art may be delayed such that boot times are extended and the performance of the network is degraded.

Accordingly, it would be desirable to provide an improved pre-boot file transfer system.

SUMMARY

According to one embodiment, an information handling system includes a communication system that is configured to couple to a network; a receive buffer that is coupled to the communication system; an application buffer; a processing system that is coupled to the receive buffer and the application buffer; and a memory system that is coupled to the processing system and that includes instruction that, when executed by the processing system, cause the processing system to provide a payload assembling engine that is configured to: receive a plurality of packets for a file through the communication system from the network in a pre-boot environment, wherein each of the plurality of packets includes a header with a file offset value; store the plurality of packets in the receive buffer in the order that the plurality of packets were received; and write the plurality of packets that were stored in the receive buffer into the application buffer in an order that is defined by the respective file offset values for the plurality of packets.

BRIEF DESCRIPTION OF THE DRAWINGS

FIG. 11 is a schematic view illustrating an embodiment of the client device receiving missed packets requested in the missed packet request of FIG. 10.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
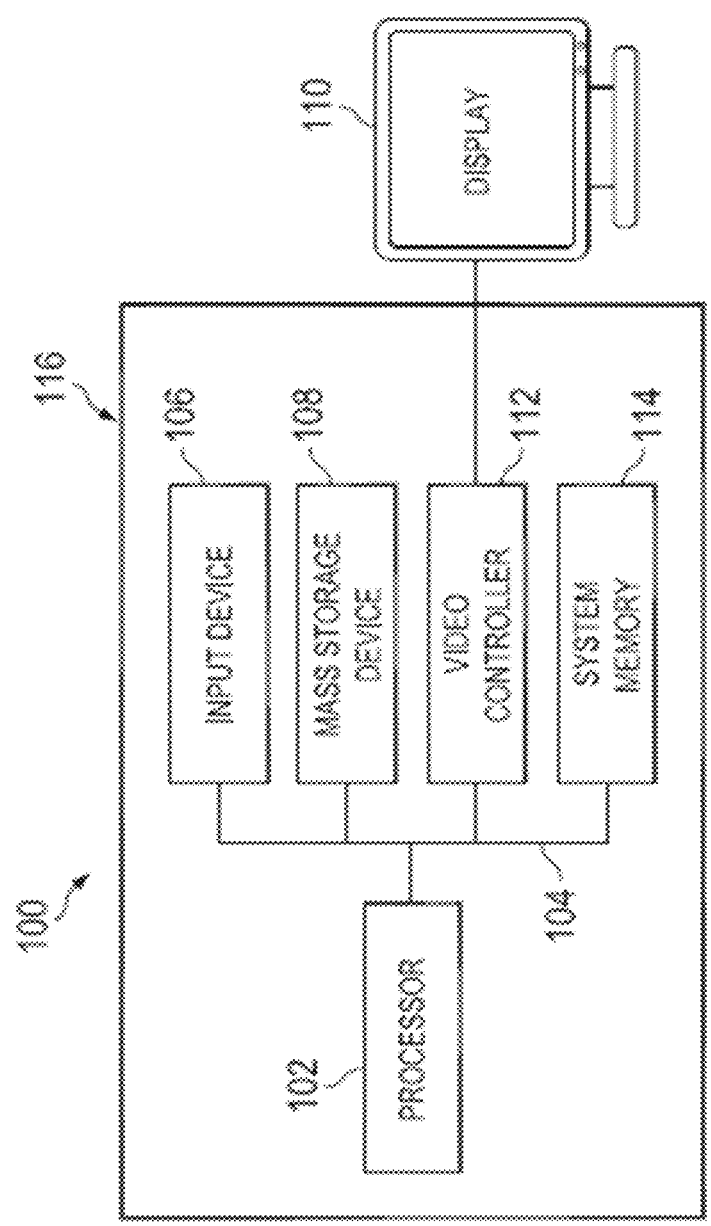
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
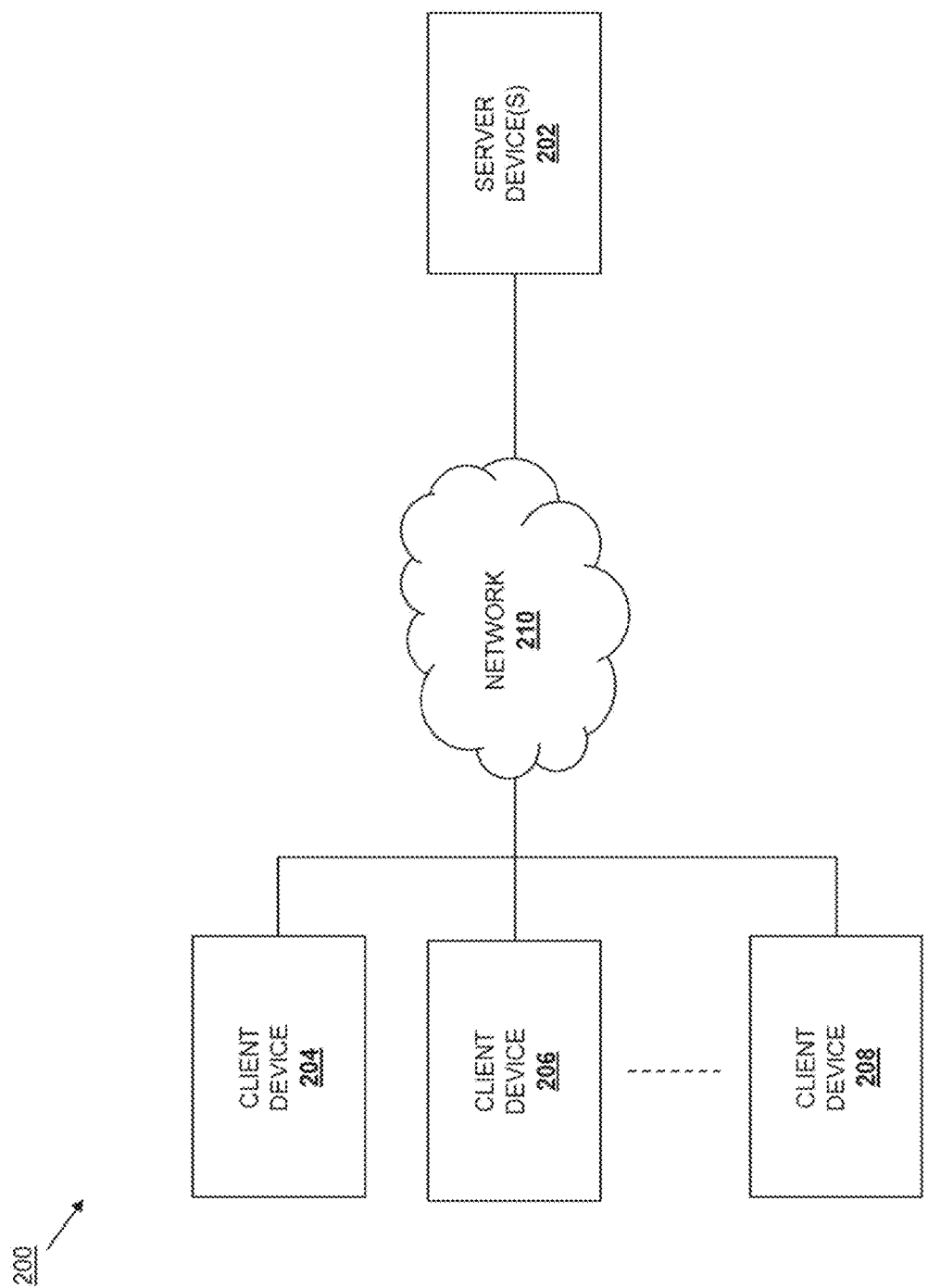
FIG. 2 is a schematic view illustrating an embodiment of a pre-boot file transfer system.

Referring now to FIG. 2, an embodiment of a pre-boot file transfer system 200 is illustrated. The pre-boot file transfer system 200 includes on or more servers 202 that are coupled to a plurality of client devices 204, 206, and up to 208, through a network 210. Any or all of the server device(s) and client device(s) may be the IHS 100 discussed above with reference to FIG. 1 and/or include some or all of the components of the IHS 100. In some examples, the network 210 in the pre-boot file transfer system 200 may be a local area network (LAN) (e.g., in a corporate environment) that couples the server device(s) 202, which may store operating system (OS) images, retrieve and distribute firmware updates, and/or provide configuration files, to client device (s) such as desktop computers, laptop computers, tablet computers, mobile phones, and/or other client devices known in the art. In other examples, the pre-boot file transfer system 200 may be provided in a datacenter that includes the server device(s) 202 coupled to the client devices 204, 206, and 208 that may include networking devices (e.g., switches, routers, etc.), storage devices, other server devices, and/or other datacenter computing devices known in the art. However, while several examples are provided below, one of skill in the art in possession of the present disclosure will recognize that a wide variety of client devices may operate in a pre-boot environment to transfer files from servers or other computing devices known in the art according to the teachings of the present disclosure while remaining within its scope.

Figure 3:
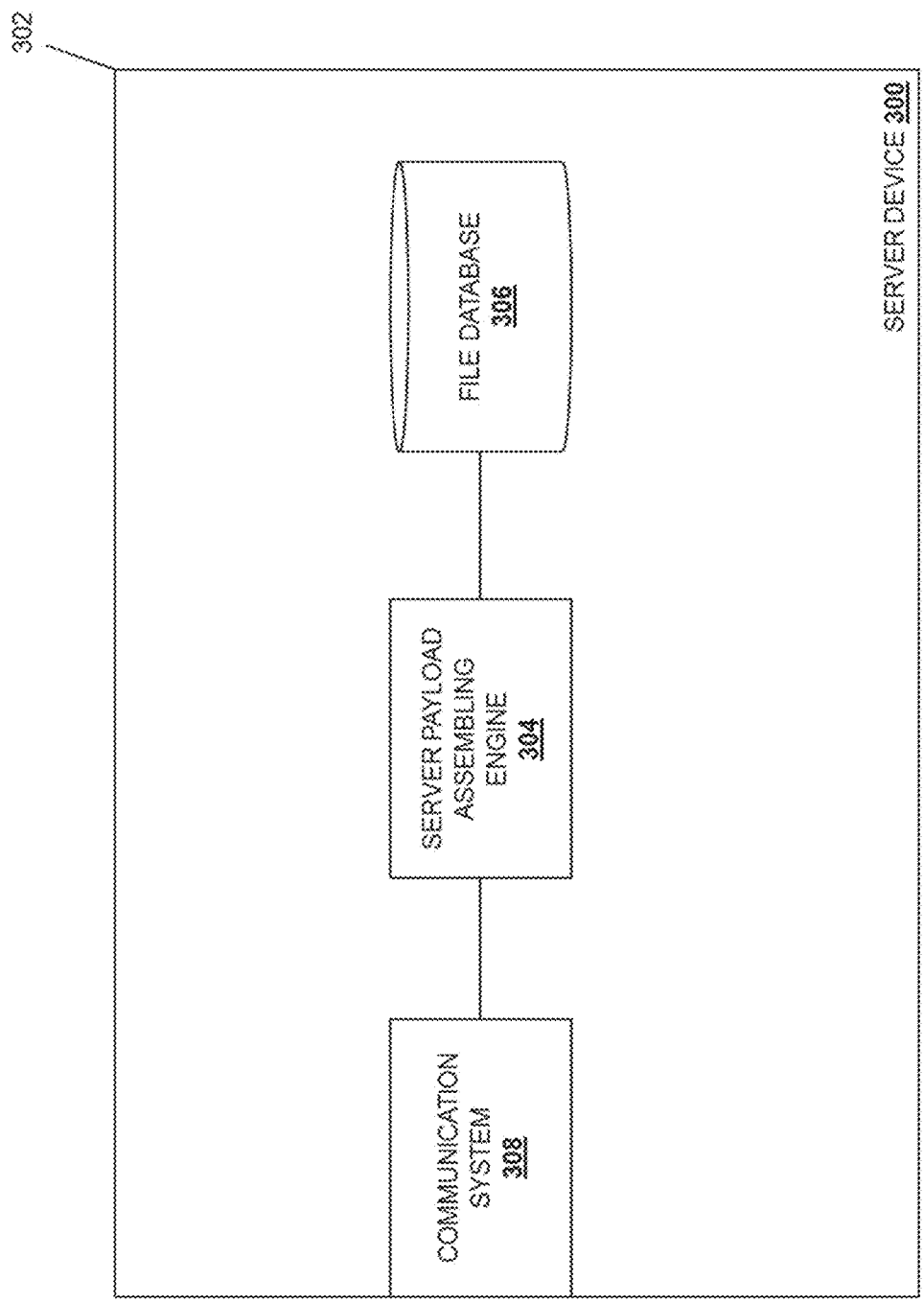
FIG. 3 is a schematic view illustrating an embodiment of one or more server devices in the pre-boot file transfer system of FIG. 2.

Referring now to FIG. 3, an embodiment of a server device 300 is illustrated. In an embodiment, the server device 300 may be the IHS 100 discussed above with reference to FIG. 1 and/or may include some or all of the components of the IHS 100. In the illustrated embodiment, the server device 300 includes a chassis 302 that houses the components of the server device 300. However, in some embodiments, the components of the server device 300 may be distributed across multiple server devices while remaining within the scope of the present disclosure. The chassis 302 of the server device 300 may house a processing system (not illustrated, but which may be the processor 102 discussed above with reference to FIG. 1) and a memory system (not illustrated, but which may be the system memory 114 discussed above with reference to FIG. 1) that is coupled to the processing system and that includes instruction that, when executed by the processing system, cause the processing system to provide a server payload assembling engine 304 that is configured to perform the functions of the server payload assembling engines and server device(s) discussed below. The server payload assembling engine 304 may be coupled to a storage device (not illustrated, but which may include the storage device 108 discussed above with reference to FIG. 1 that is coupled to the processing system) that is housed in the chassis 302 and that includes a file database 306. While the file database 306 is discussed as being included in the storage device that is housed in the chassis 302, in some embodiments, the file database 306 may be housed external to the chassis 302 (e.g., connected to server device 300 directly or through a network) while remaining within the scope of the present disclosure. The chassis 302 of the server device 300 also houses a communication system 308 that is coupled to the server payload assembling engine 304 (e.g., via a coupling to the processing system) and that may include a Network Interface Controller (NIC), a wireless communication system, and/or a variety of other communication systems known in the art. While a specific embodiment is described and discussed below as a server device 300 that houses the server payload assembling engine 304, a wide variety of devices other that server devices may incorporate payload assembling engines similar to the server payload assembling engine 304 discussed below while remaining within the scope of the present disclosure.

Figure 4:
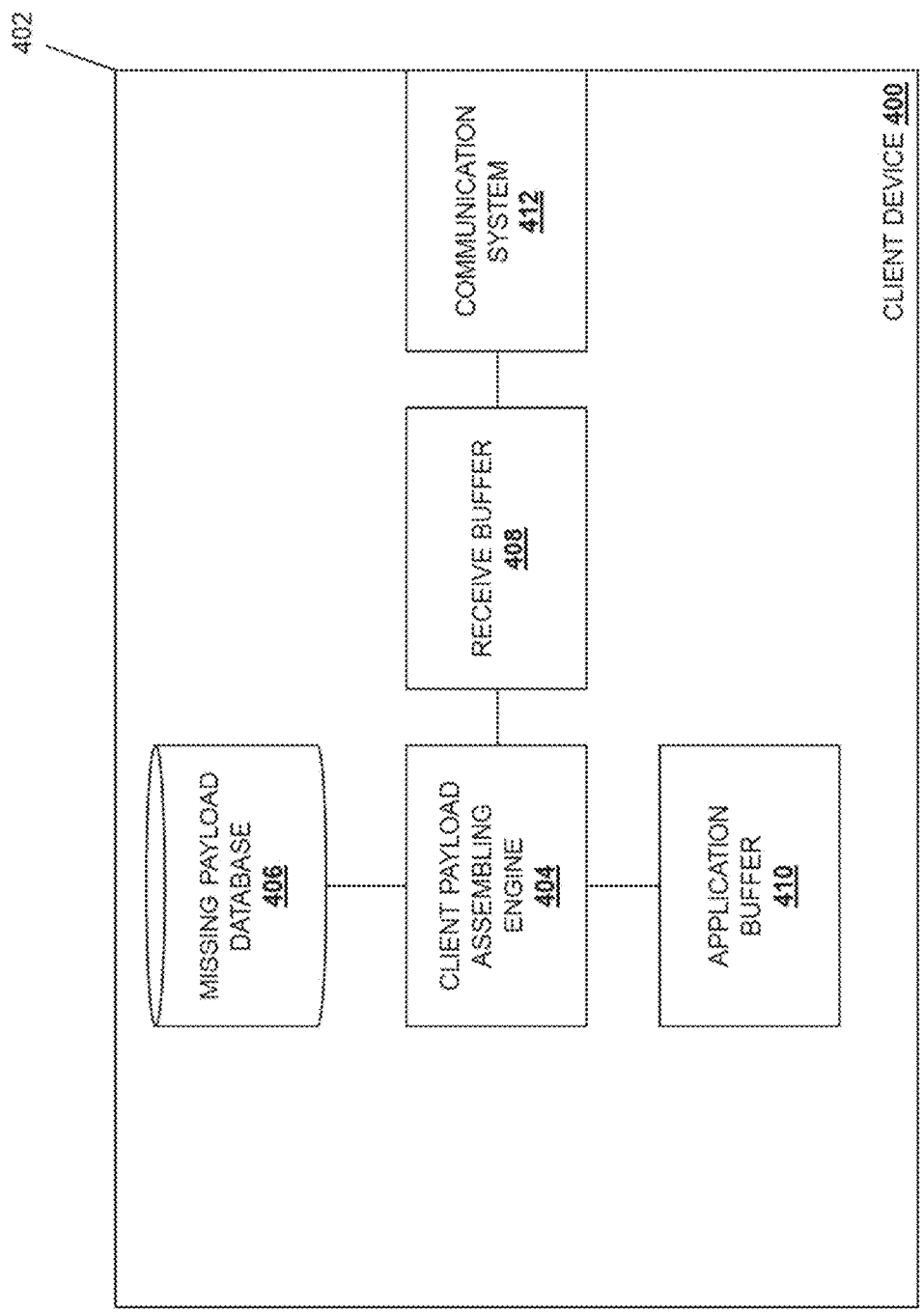
FIG. 4 is a schematic view illustrating an embodiment of a client device in the pre-boot file transfer system of FIG. 2.

Referring now to FIG. 4, an embodiment of a client device 400 is illustrated. In an embodiment, the client device 400 may be the IHS 100 discussed above with reference to FIG. 1 and/or may include some or all of the components of the IHS 100. The client device 400 includes a chassis 402 that houses the components of the client device 400. The chassis 402 of the client device 400 may house a processing system (not illustrated, but which may be the processor 102 discussed above with reference to FIG. 1) and a memory system (not illustrated, but which may be the system memory 114 discussed above with reference to FIG. 1) that is coupled to the processing system and that includes instruction that, when executed by the processing system, cause the processing system to provide a client payload assembling engine 404 that is configured to perform the functions of the client payload assembling engines and client device(s) discussed below. The client payload assembling engine 404 may be coupled to a storage device (not illustrated, but which may include the storage device 108 discussed above with reference to FIG. 1 that is coupled to the processing system) that is housed in the chassis 402 and that includes a missing payload database 406. While the missing payload database 406 is discussed as being included in the storage device that is housed in the chassis 402, in some embodiments, the missing payload database 406 may be housed external to the chassis 402 (e.g., connected to client device 400 directly or through a network) while remaining within the scope of the present disclosure.

In an embodiment, the memory system of the client device 400 may also include one or more memory devices that provide a receive buffer 408 and an application buffer 410 that are each coupled to the client payload assembling engine 404 (e.g., via the coupling between the processing system and the memory system). As would be understood by one of skill in the art in possession of the present disclosure, the client device 400 may include a plurality components (not illustrated, but which may include the processing system and memory system discussed above) that are configured to provide an application such as, for example, an operating system and/or other applications known in the art. As discussed below, the receive buffer 408 may be utilized to temporarily store data that is received through the communication system 412, while the application buffer 410 may be utilized to temporarily store data for providing and/or updating an application, discussed in further detail below. The chassis 402 of the client device 400 also houses a communication system 412 that is coupled to the receive buffer 408 (e.g., via a coupling to the memory system) and that may include a Network Interface Controller (NIC), a wireless communication system, and/or a variety of other communication systems known in the art. While a specific embodiment is described and discussed below as a client device that houses the client payload assembling engine 404, a wide variety of devices other than client devices may incorporate a payload assembling engine similar to the client payload assembling engine 404 discussed below while remaining within the scope of the present disclosure.

Figure 5:
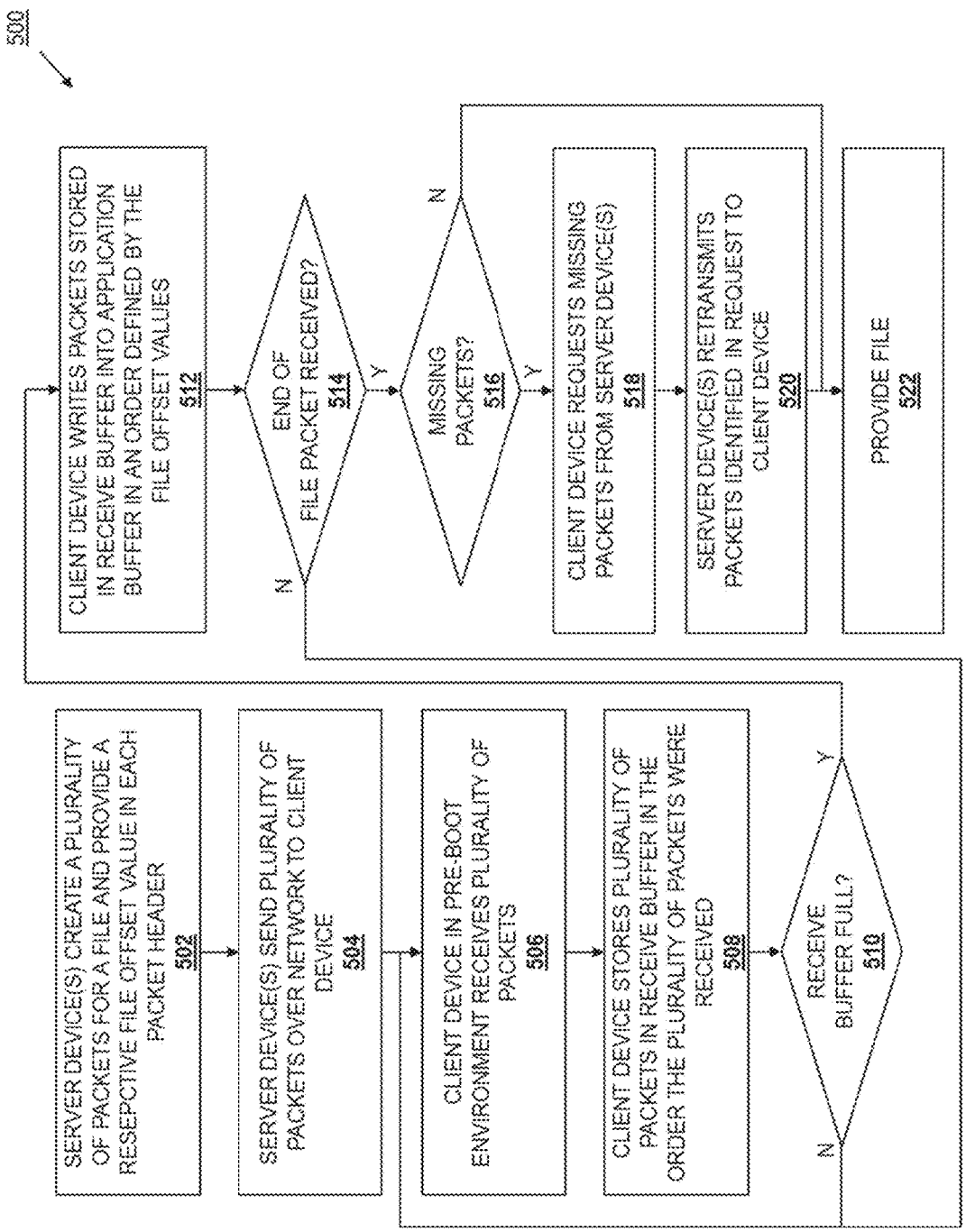
FIG. 5 is a flow chart illustrating an embodiment of a method for transferring files in a pre-boot environment.

Referring now to FIG. 5, an embodiment of a method 500 for transferring a file in a pre-boot environment is illustrated. As discussed above, conventional pre-boot file transfer systems employ packet sequencing by the server device and packet reordering by the client device can make the associated TCP data transmissions relatively processing heavy, while the sending of acknowledgements for received packets and per-lost-packet retransmission requests consume network bandwidth and reduce network throughput as well as overall network performance. Those and other factors can cause the TCP receive buffer to provide a bottleneck (as that buffer isn't cleared until all packets have been received and ordered). As such, conventional pre-boot file transfer operations such as OS image deployment and firmware updates take a relatively long time and can degrade network performance. The method 500 and systems disclosed herein remedy such issues by utilizing file offsets for reliable and faster transfer of large files in pre-boot environments. As discussed below, the systems and method 500 may operate by determining the offsets for the actual file that is being transferred, and instead of sequencing every TCP packet, adding those file offsets to the headers of packets that are used to transfer the file in order to overcome the reordering and associated overhead in holding TCP packets in the receive buffer until they are assembled in their sequencing order. As discussed below, a file size may be shared (e.g., during protocol negotiation) and used to confirm that the complete file has been transferred.

The method 500 begins at block 502 where server device(s) create a plurality of packets for a file and provide a respective file offset value in each packet header. In one embodiment, the client device 204 in the pre-boot file transfer system 200 may be powered on, reset, and/or otherwise initialized, and in response may enter a pre-boot environment such as, for example, a Unified Extensible Firmware Interface (UEFI) pre-boot environment. In an embodiment, an initial handshake between the client device 204 and the server device(s) 202 may include a query to determine whether the systems and methods of the present disclosure are supported by both the client device 204 and the server device(s) 202. For example, the client device 204 operating according to the systems and methods of the present disclosure may query the server device(s) 202 about the TCP capability to support the systems and methods of the present disclosure, and if the server device(s) 202 support those systems and methods, then each of the client device 204 and the server device(s) 202 may configured themselves to operate according to the pre-boot file transfer method discussed below. If the server device(s) 202 do not support those systems and methods, then each of the client device 204 and the server device(s) 202 may configure themselves to operate according to conventional pre-boot file transfer methods known in the art.

In response to entering the pre-boot environment, the client device 204 may communicate with the server device(s) 202 to request an OS image, a firmware update, a configuration file, and/or other pre-boot environment files known in the art. At block 502, the server payload assembling engine 304 may receive those communications and, in response, determine and retrieve an OS image, firmware update, configuration file, and/or other file requested by the client device 204 from the file database 306. For example, the server payload assembling engine 304 may create a plurality of packets for the retrieved file, determine a respective file offset value for each of the packets, and provide that respective file offset value in the header of that packet. For example, if the TCP maximum payload size is 8192 bytes, at block 502 the server payload assembling engine 304 may create a first packet that includes a first file offset value of "0" in its header, a second packet that includes a second file offset value of "8192" in its header, a third packet that includes a third file offset value of "16384" in its header, and so on. In addition, as discussed above, a file size may be shared during protocol negotiation and used later in the method 500 to determine whether the complete file has been transferred.

Figure 6:
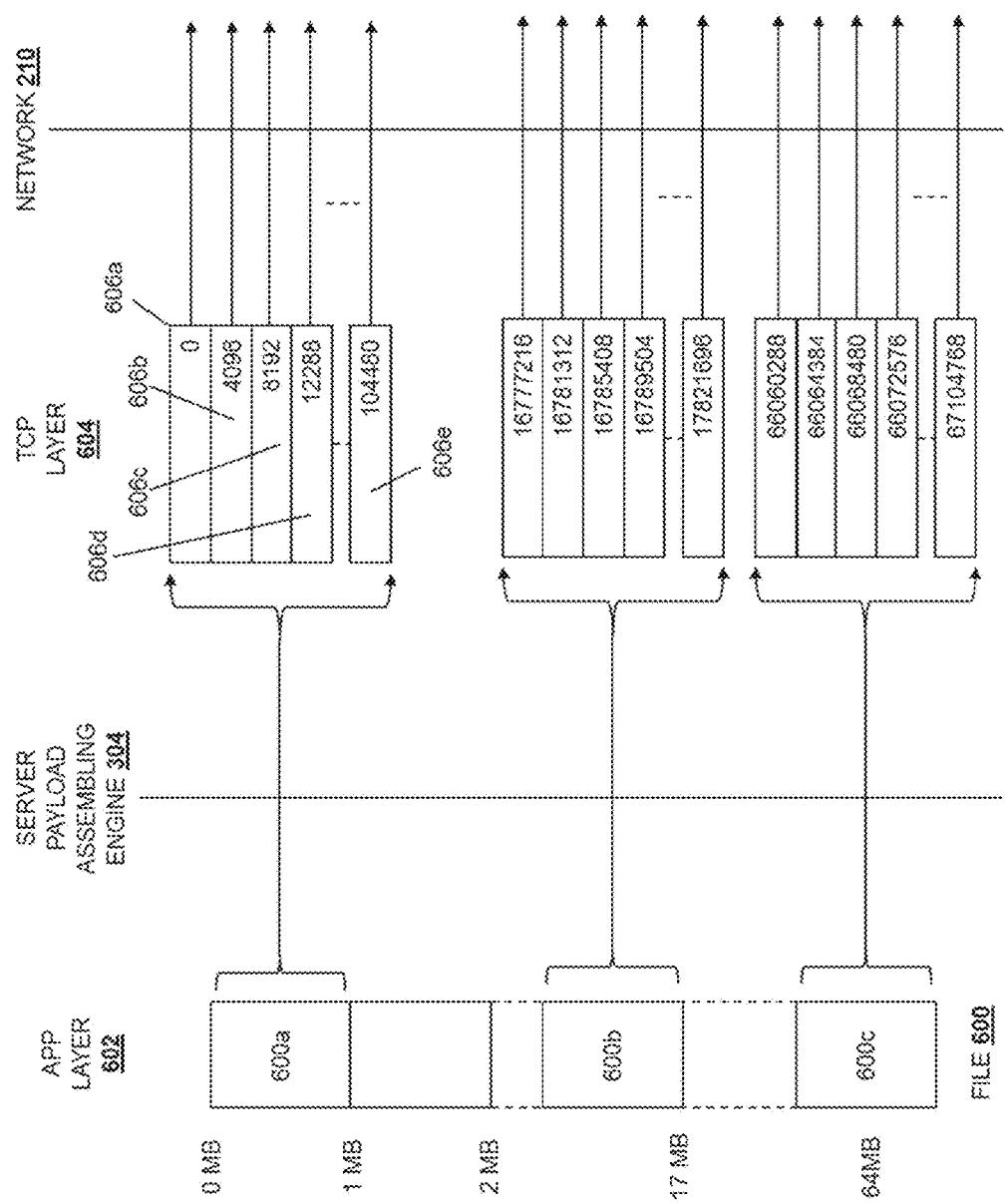
FIG. 6 is a schematic view illustrating an embodiment of a server device transferring a file in a pre-boot environment.
Figure 7:
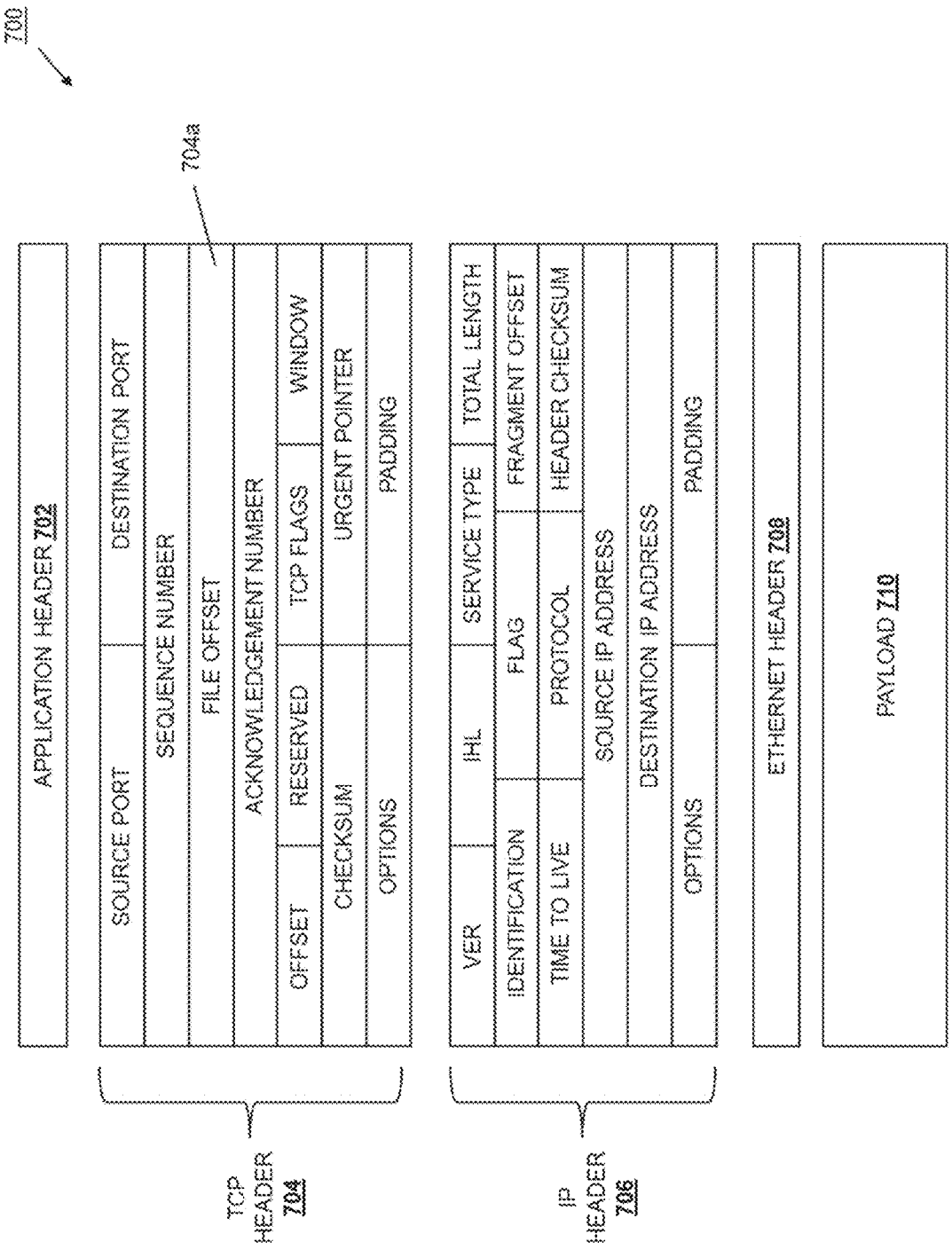
FIG. 7 is a schematic view illustrating an embodiment of a packet transferred by the server device in the pre-boot environment of FIG. 6.

Referring now to FIGS. 6 and 7, embodiments of the creation of packets at block 502 are illustrated. FIG. 6 illustrates a file 600 in an application layer 602 of the server device 300 that is processed by the server payload assembling engine 304 to create a plurality of packets in a TCP layer 604 of the server device 300. In the illustrated embodiment, the file 600 is a 64MB OS image. However, in other embodiments, the file 600 may be a different size and different type of file while remaining within the scope of the present disclosure. In the illustrated embodiment, the file 600 is divided into 1MB portions that are processed by the server payload assembling engine 304 to create a plurality of packets. For example, a first portion 600a of the file 600 may be processed at block 502 to create a first packet 606a with an file offset value of "0", a second packet 606b with a file offset value of "4096", a third packet 606c with a file offset value of "8192", a fourth packet 606d with a file offset value of "12288", and up to a last packet 606e with a file offset value of "104480". Similarly, a second portion 600b of the file 600 may be processed at block 502 to create a plurality of packets with respective file offset values, a third portion 600c of the file 600 may be processed at block 502 to create a plurality of packets with respective file offset values, and any other portions of the file may be processed to create a plurality of packets with respective file offset values as illustrated in FIG. 6.

FIG. 7 illustrated an embodiment of a packet 700 created at block 502. In the illustrated embodiment, the packet 700 includes an application header 702, a TCP header 704, an Ethernet header 708, and a payload 710. Once of skill in the art will recognize that the application header 702, IP header 706, and Ethernet header 708 are conventional headers provided in packets known in the art. However, the TCP header 704 in the illustrated embodiment includes a file offset field 704a. For example, the file offset field 704a may utilize at least some portion of the 128-bit reserved field in the TCP header 704. In a specific example, the file offset field 704a may be 64-bits. However, other sizes and fields in the TCP header 704 may be utilized in providing the file offset field 704a while remaining within the scope of the present disclosure.

With reference to FIGS. 6 and 7, at block 502 the server payload assembling engine 304 may add a file offset value to the file offset field 704a in the TCP header 704 of the packet 700. For example, for the first portion 600a of the file 600, a file offset value of "0" may be provided in the file offset field 704a of the TCP header 704 for the first packet 606a, a file offset value of "4096" may be provided in the file offset field 704a of the TCP header 704 for the second packet 606b, a file offset value of "8192" may be provided in the file offset field 704a of the TCP header 704 for the third packet 606c, a file offset value of "12288" may be provided in the file offset field 704a of the TCP header 704 for the first packet 606d, and a file offset value of "104480" may be provided in the file offset field 704a of the TCP header 704 for the last packet 606e. File offset values may be added to the file offset fields in the TCP headers of the packets created for the second portion 600b and third portion 600c of the file 600 in a similar manner.

The method 500 then proceeds to block 504 where the server device(s) send the plurality of packets over the network to the client device. In an embodiment, the server device(s) 202 send the packets created at block 502 over the network 210 to the client device 204. For example, FIG. 6 illustrates how the server payload assembling engine 304 sends the first packet 606a for the first portion 600a of the file 600 over the network 210, sends the second packet 606b for the first portion 600a of the file 600 over the network 210, sends the third packet 606c for the first portion 600a of the file 600 over the network 210, sends the fourth packet 606d for the first portion 600a of the file 600 over the network 210, and sends the last packet 606e for the first portion 600a of the file 600 over the network 210. The packets created for the second portion 600b and third portion 600c of the file 600 may be sent over the network 210 in a similar manner.

The method 500 then proceeds to block 506 where the client device in the pre-boot environment receives the plurality of packets. In an embodiment, at block 506 the client device 204 receives the plurality of packets from the sender device(s) 202 through the network 210. For example, the communication system 412 in the client device 204/400 may receive the plurality of packets sent from the sender device(s) 202 at the communication system 412 that is coupled to the network 210. The method 500 then proceeds to block 508 where the client device stores the plurality of packets in a receive buffer in the order those packets were received. In an embodiment, the client device 204 stores the plurality of packets received from the sender device(s) 202 in the receive buffer 408. For example, the client payload assembly engine 404, a processing system provided in the communication system 412, and/or other subsystems in the client device 204/400 may operate at block 508 to store the plurality of packets received at the communication system 412 in the receive buffer 408 in the order in which they are received (e.g., irrespective of the sequence numbers that may be included in the headers of those packets).

The method 500 then proceeds to decision block 510 where it is determined whether the receive buffer is full. In an embodiment, the client payload assembling engine 304 may monitor, communicate with, and/or otherwise determine at decision block 510 whether the receive buffer 408 in the client device 204/400 is full. If at decision block 510 it is determined that the receive buffer 408 is not full, the method 500 loops through blocks 506, 508, and 510 where the client device 204/400 receives packets from the server device(s) 202 and stores them in the receive buffer 408 in the order in which they're received until the receive buffer 408 is full. If, at decision block 510, it is determined that the receive buffer is full, the method 500 then proceeds to block 512 where the client device writes the packets stored in the receive buffer into an application buffer in an order that is defined by the file offset values in the headers of those packets. In an embodiment, at decision block 510, the client payload assembling engine 404 may determine that the receive buffer 408 is full and, in response, write the packets that are in the full receive buffer 408 into the application buffer 410. While the writing of a single file (e.g., the file 600 sent by the server device(s) 202) is described below, multiple files may be written to the application buffer 410 of the client device 400 while remaining within the scope of the present disclosure. For example, the packet headers for the packets created from different files may include meta data (e.g., in addition to the file offset value discussed above) that indicates which file that packet belongs to, and the client payload assembling engine 404 may be configured to write each packet to its appropriate file (according to the meta data) similarly as discussed for the single file below.

Figure 8:
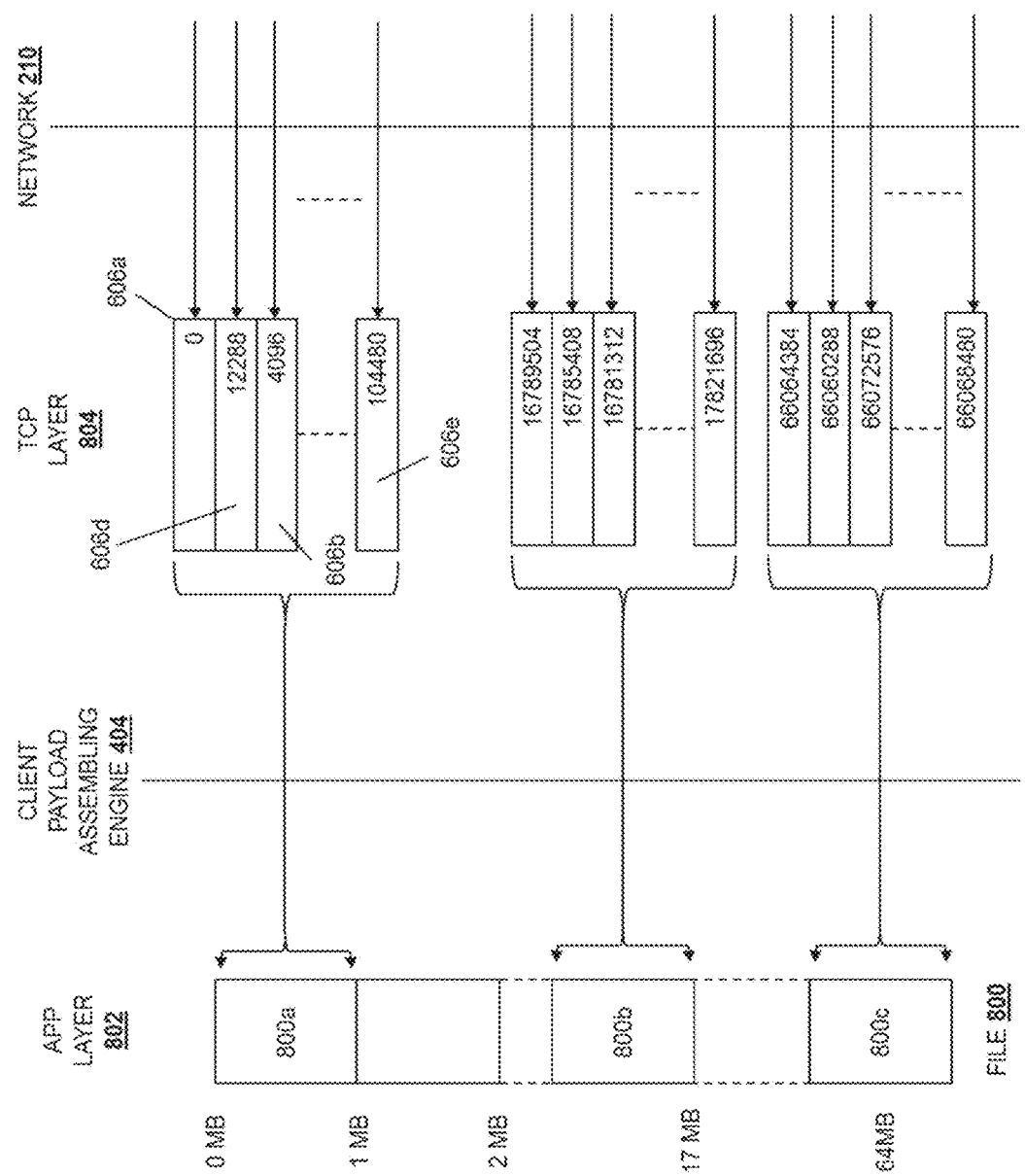
FIG. 8 is a schematic view illustrating an embodiment of a client device receiving a file in a pre-boot environment.

Referring now to FIG. 8, an embodiment of the client device 204/400 receiving the plurality of packets from the sender device(s), storing those packets in the receive buffer 408, and then writing those packets to the application buffer 410, is illustrated. FIG. 8 illustrates a file 800 in an application layer 802 of the client device 400 (e.g., the application buffer 410) that is created by the client payload assembling engine 404 using a plurality of packets retrieved through a TCP layer 804 of the client device 400 (e.g., the receive buffer 408) after those packets were received through the network 210. In the embodiment discussed below, the file 800 is the file 600 (i.e., the 64MB OS image) sent from the server device 202/300 in FIG. 6. However, in other embodiments, the file 800 may be a different size and different type of file sent by the server device(s) 202 while remaining within the scope of the present disclosure. As with the file 600 in FIG. 6, in the illustrated embodiment, the file 600 includes 1MB portions that are created by the client payload assembling engine 404 using the plurality of packets. However, as can be seen in FIG. 8, the packets received from the server device(s) 202 through the network 210 may not be received in the order in which they were sent by the server device(s) 202 or in a sequence in which they need to be arranged in order to create the file 800.

For example, the first packet 606a (which was the first packet sent by the server device(s) 202/300 in FIG. 6) may be received first by the client device 204/300, the fourth packet 606d (which was the fourth packet sent by the server device(s) 202/300 in FIG. 6 following the first packet 606a, the second packet 606b, and the third packet 606c) may be received second by the client device 204/300, the second packet 606b (which was the second packet sent by the server device(s) 202/300 in FIG. 6 following the first packet 606a) may be received third by the client device 204/300, as so on until the receive buffer 408 is full. Of note in FIG. 8 is that the third packet 606c (which was the third packet sent by the server device(s) 202/300 in FIG. 6 following the first packet 606a and the second packet 606b) is not received by the client device 204/400. For example, the third packet 606c may have been dropped, mis-transmitted, and/or otherwise "lost" as it traveled through the network 210 to the client device 204/400, and thus not received by the client device 204/400. Similarly, the packets sent by the server device(s) 202 for the second portion 606b and the third portion 606c of the file 600 in FIG. 6 may be received by the client device 204/400 in a different order in which they are sent, as well as lost as discussed above.

In a specific example, once the receive buffer 408 is full, the client payload assembling engine 404 may begin to write the received packets into the application buffer 410. Specific components of the client payload assembling engine 404 may include an application that called for the file, as well as application wrappers. The client payload assembling engine 404 may notify that application to read the packet payloads, and instruct the application wrappers to write the packet payloads to create the file 800 on a memory device that provides the application buffer 410 using the file offset values in the packet headers. In addition, the client payload assembling engine 404 may be configured to "pad" locations in the application buffer 410 that are associated with a packet having a file offset value that has not been received yet. For example, the application wrappers in the client payload assembling engine 404 may be configured to pad locations in the memory device that provides the application buffer 410 with a well-known pattern (e.g., a random data pattern, all 0's, etc.) when a packet includes a file offset value that requires the writing of the packet payload for that packet at a location in the application buffer 410 that is spaced apart from the most recently written location in the application buffer 410.

In an embodiment, with reference to FIG. 8, the client payload assembling engine 404 may determine that the first packet 606a in the receive buffer 408 includes the file offset value "0" and, in response, write the payload of the first packet 606a into a first location in the application buffer 410. The client payload assembling engine 404 may determine that the fourth packet 606d in the receive buffer 408 (which was received immediately following the first packet 606a as discussed above) includes the file offset value "12288" and, in response, pad a second location (corresponding to a file offset value of 4096) that is immediately adjacent the first location in the application buffer 410, and pad a third location (corresponding to a file offset value of 8192) that is immediately adjacent the second location in the application buffer 410, and then write the payload of the fourth packet 606d into a fourth location that is immediately adjacent the third location in the application buffer 410. In some embodiments, in response to padding a location in the application buffer 410, the client payload assembling engine 404 may identify the file offset value that is associated with that location in the application buffer 410. Using the example provided above, in response to padding the second and third locations in the application buffer 410, the client payload assembling engine 404 may store the identity of the file offset values 4096 and 8192 (corresponding to the file offset values of packets whose payloads would be written to the second and third locations, respectively) in a table in the missing payload database 406. As such, at least some of a first portion 800a of the file 800, a second portion 800b of the file 800, and a third portion 800c of the file 800, may be written at block 512.

Figure 9:
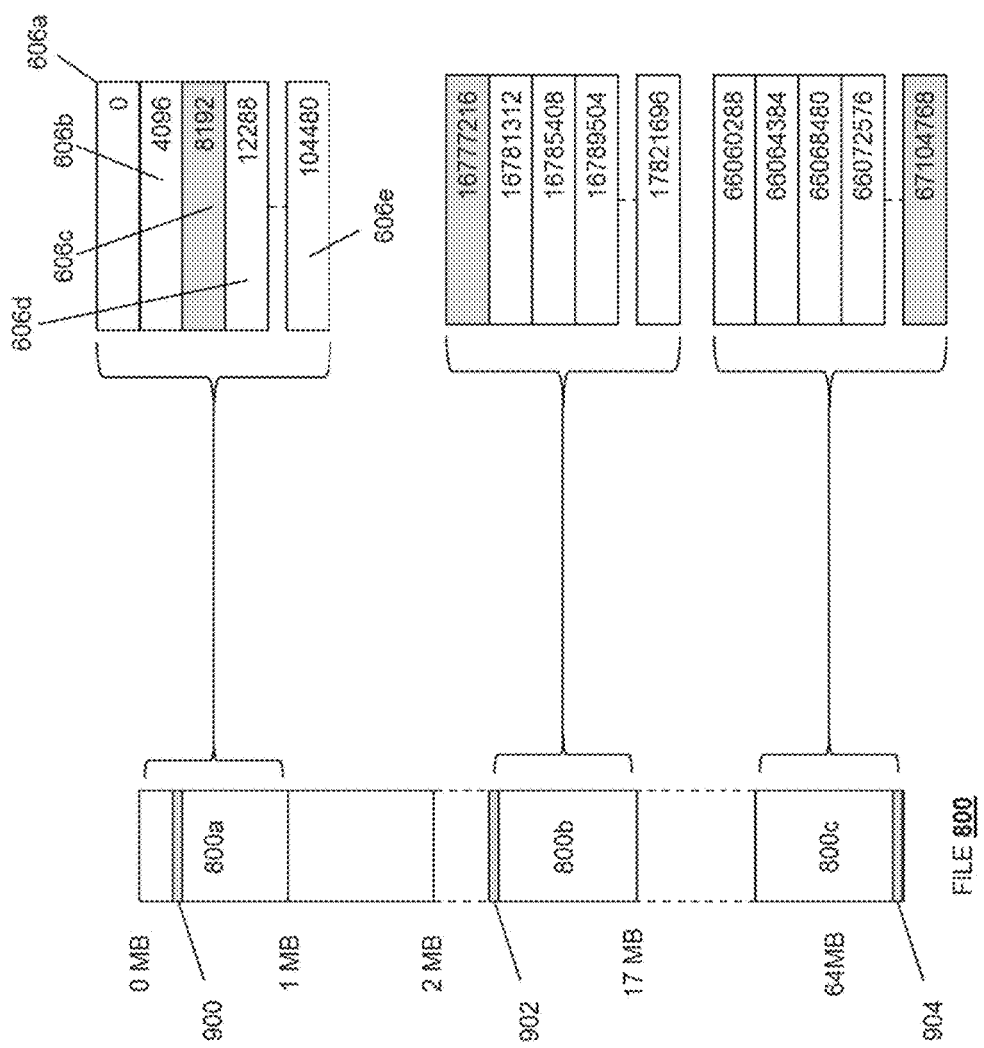
FIG. 9 is a schematic view illustrating an embodiment of missed packets in a file received by the client device in the pre-boot environment of FIG. 8.

Referring now to FIG. 9, an embodiment of the file 800 written to the application buffer 410 at block 512 is illustrated. The example of the file 800 in FIG. 9 illustrates how the packet payloads are written to the application buffer 410 according to their respective file offset values, and how if packets are not received or otherwise not written to the application buffer 410, the corresponding locations in the application buffer 410 may be padded (illustrated in FIG. 9 by the greyed out areas in the portions 800a, 800b, and 800c of the file 800). For example, the first portion 800a of the file 800 includes the payloads of the first packet 606a, the second packet 606b, the fourth packet 606d, and the last packet 606e written to the application buffer 410 according to their respective file offset values (e.g., "0", "4096", "12288", and "104480"), as well as a padded location 900 in the application buffer 410 corresponding to the third packet 606c that was not received and stored in the receive buffer 408 (e.g., corresponding to the file offset value of 8192). Similarly, the second portion 800b of the file 800 includes the payloads from the packets written to the application buffer 410 along with a padded location 902 (e.g., corresponding to the file offset value of "16777216"), and the third portion 800c of the file 800 includes the payloads from the packets written to the application buffer 410 along with a padded location 904 (e.g., corresponding to the file offset value of "67104768").

In some embodiments, a location in the application buffer may be padded and the corresponding file offset value identified in the missing payload database 406, following by the writing of a payload for a packet to that location and the removal of the file offset value identified in the missing payload database 406. Using the example discussed above where the fourth packet 606d is received immediately following the first packet 606a and stored in the receive buffer 408, upon retrieval of that fourth packet 606d from the receive buffer 408, a second location (corresponding to a file offset value of "4096") and a third location (corresponding to a file offset value of "8192") in the application buffer 410 may be padded, and then payload for the fourth packet 606d may be written into the fourth location in the application buffer 410. Subsequently, the second packet 606b (which was received immediately following the fourth packet 606d and stored in the receive buffer 408, as illustrated in FIG. 8) may be retrieved from the receive buffer 408 and have its payload written over the padding and at the second location in the application buffer 410, followed by the identifier for its file offset value (i.e., "4096") being removed from the missing payload database 406. As such, the packets that were received and stored in the receive buffer 408 in the order in which they were received may be retrieved from the receive buffer 408 in that order and written to their proper locations in the application buffer 410 based on their respective file offset values, while locations in the application buffer 410 that are being skipped (e.g., due to their associated packets having not been received, or having been received later than the packet that is currently being retrieved from the receive buffer 408) are padded and their associated file offset values identified, and those padded locations may subsequently written over with packets when those packets are retrieved from the receive buffer 408.

The method 500 then proceeds to decision block 514 where it is determined whether an end-of-file packet was received. In an embodiment, the server payload assembling engine 304 in the server device(s) 202/300 may send an end-of-file or end-of-transaction packet over the network 210 to the client device 204 when all of the packets for the file 600 have been transmitted over the network 210. The client payload assembling engine 304 may monitor the communication system 308 for the end-of-file packet and, if at decision block 514 that end-of-file packet is not received, the method 500 may loop back through blocks 506, 510, and 512 where packets are received, stored in the receive buffer 408, and then written to the application buffer 410 when the receive buffer 408 is full, as discussed above. As such, the client device 204 does not reorder packets according to sequence numbers in their headers, and does not wait for a missed packet to be retransmitted before writing packets to the application buffer 410. Thus, each of the first portion 800*a*, the second portion 800*b*, and the third portion 800*c* (as well as the other portions) of the file 800 may be written to the application buffer 410 as discussed above. If at decision block 514, it is determined that the end-of-file packet has been received, the method 500 proceeds to decision block 516 where it is determined whether there are missing packets.

In an embodiment of decision block 516, the client payload assembling engine 304 accesses the missing payload database 406 and determine if there are any file offset values identified. If no file offset values are identified in the missing payload database 406, then no missing packets are determined at decision block 516, and the method 500 proceeds to block 522, discussed in further detail below. However, with reference to FIG. 9, the client payload assembling engine 304 may review the missing payload database 406 and determine that the file offset value "8192" is identified for the third packet 606*c* that was not received, and the file offset values "16777216" and "67104768" are identified for the packets that were not received for the second portion 800*b* and the third portion 800*c* of the file 800, and thus may determine that there are missing packets. In response to determining that there are missing packets at decision block 516, the method 500 proceeds to block 518 where the client device request the missing packets from the server device(s). In an embodiment, the client payload assembling engine 304 may determine the file offset values identified in the the missing payload database 406 and, in response, send a request through the network 210 to the server device(s) 202 for the packets associated with those file offset values.

Figure 10:
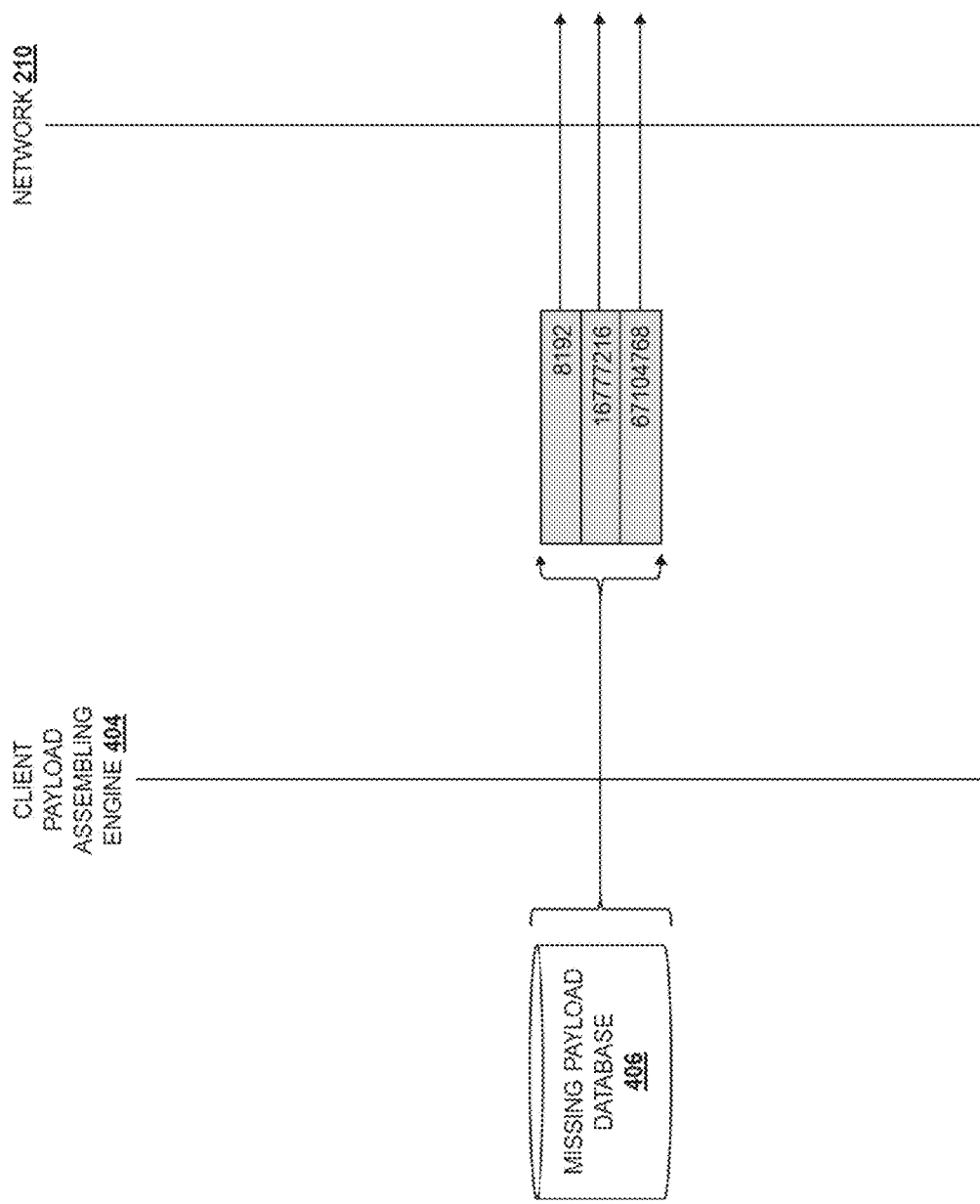
FIG. 10 is a schematic view illustrating an embodiment of the client device transmitting a missed packet request in the pre-boot environment of FIG. 8.

Referring now to FIG. 10, the client payload assembling engine 404 is illustrated determining that the packets associated with the file offset values "8192", "16777216", and "67104768" are identified in the missing payload database 406 and, in response, sending a retransmission request for the packets associated with those file offset values over the network 210. In an embodiment, the client payload assembling engine 404 may send the retransmission request in a single packet that includes each of the file offset values that were identified in the missing payload database 406. However, the retransmission request may be provided from the client device 204 to the server device(s) 202 in a variety of manners that will fall within the scope of the present disclosure. The method 500 then proceeds to block 520 where the server device(s) retransmit packets to the client device that were identified in the request. In an embodiment, server payload assembling engine 304 may receive the retransmission request through the network 210 via the communication system 308 and, in response, retrieve the file offset values included in the retransmission request and retransmit the packets identified by those file offset values through the network 210 to the client device 204. For example, the server payload assembling engine 304 may retransmit the third packet 606*c* identified by the file offset value "8192", as well as the packets identified by the file offset values "16777216", and "67104768". When the server payload assembling engine 304 is done sending the packets identified in the retransmission request, it may send an end-of-file packet similarly as discussed above.

Referring now to FIG. 11, the client payload assembling engine 404 is illustrated receiving the packets associated with the file offset values "8192", "16777216", and "67104768" through the network 210 via the communication system 412. Similarly as discussed above, those packets may be stored in the receive buffer 408 in the TCP layer 804 of the client device 202, then written by the client payload assembling engine 404 to the application buffer 410 in the application layer 802 of the client device 202. As can be seen, each of the packets received by the client device 202 at block 520 is written to the respective location in the application buffer 410 associated with its respective file offset value (e.g., the first packet 606*c* is written to the location in the application buffer 410 corresponding to the file offset value "8192", the packet with the file offset value of "16777216" is written to the appropriation location in the second portion 800*b* of the file 800, and the packet with the file offset value of "67104768" is written to the appropriation location in the third portion 800*c* of the file 800. When the client payload assembling engine 404 receives the end-of-file packet from the server device(s) 202, it may again determine whether there are missing packets. As such, in some embodiments, blocks 516, 518, and 520 may be repeated until all missing packets have been received and their payloads written to the application buffer 410. As discussed above, a file size shared during protocol negotiation may be used to confirm that the complete file has been transferred from the server device to the client device.

Once all of the missing packets have been received, or if there were no missing packets determined at decision block 516, the method 500 proceeds to block 522 where the file is provided. In an embodiment, the client payload assembling engine 304 may determine that the file 800 is complete, send a transmission success notification to the server device (s) 202, and provide that file for the purpose it was requested. For example, if the file is an OS image, the OS image may be then be loaded on the client device 202 as part of the boot process. In another example, if the file is a firmware update, the file may be provided to update the firmware in the client device. In yet another example, if the file is a configuration file, the file may be used to configure the client device. While a few examples of files are provided, one of skill in the art in possession of the present disclosure will recognize that any of a variety of files may be transferred using the method 500 while remaining within the scope of the present disclosure.

In the description of the method 500, several possible features have been omitted for clarity of discussion and illustration, but it should be understood that other functionality may be realized during the performance of the method 500. For example, the end-of-file packet sent by the server device(s) 202 may be lost, discarded, or otherwise not received by the client device 204. To deal with such situations, the server payload assembling engine 404 may start a timer upon sending the end-of-file packet and, if a transmission success packet is not received from the client device 204 in a predetermined amount of time, the server device(s) 202 may retransmit the end-of-file packet and reset the timer. If the transmission success packet is not received after some predetermined number of times being sent using this process, the server payload assembling engine 404 may send a notification that the client system 202 is unavailable and close the connection to the client system 202.

Thus, systems and methods have been described that provide for file transfer in a pre-boot environment using file offset values for reliable and fast transfer of large files. The systems and methods reduce the complexity associated with transport layer protocols that involve TCP packet sequencing and reordering, while also greatly reducing bottleneck issues in UEFI based TCP receive buffer handling. As such, pre-boot operations such as OS image deployment, firmware updates, configuration file retrieval, and/or other pre-boot actions known in the art may be performed quicker than is possible with conventional systems while not degrading the performance of the network as is common with such conventional systems, thus increasing boot times.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pre-boot file transfer system comprising:
at least one server device that is configured to:
create a plurality of packets for a file;
store a respective file offset value for each of the plurality of packets in a header of that packet, wherein the respective file offset value defines a position of a respective packet of the plurality of packets in a file offset order; and
transmit each of the plurality of packets over a network; and
a client device that is coupled to the at least one server device through the network, wherein the client device is configured to:
receive, through the network in a pre-boot environment, each of the plurality of packets in a packet receive order that is different than the file offset order that is defined by the respective file offset values;
store the plurality of packets in a receive buffer in the packet receive order in which the plurality of packets were received; and
write the plurality of packets that were stored in the receive buffer into the application buffer in the file offset order that is defined by the respective file offset values for the plurality of packets.

2. The pre-boot file transfer system of claim 1, wherein the client device is configured to:
write a first packet of the plurality of packets that was stored in the receive buffer into a first location in the application buffer according to a first file offset value for the first packet; and
determine that a third packet of the plurality of packets that was received immediately subsequent to the first packet and stored in the receive buffer includes a third file offset value that indicates that the third packet is to be written to a third location in the application buffer that is separated from the first location in the application buffer by a second location in the application buffer and, in response, pad the second location in the application buffer.

3. The pre-boot file transfer system of claim 2, wherein the client device is configured to:
determine that a second packet that was that was received subsequent to the third packet and stored in the receive buffer includes a second file offset value that is associated with the second location in the application buffer and, in response, write the second packet into the second location in the application buffer.

4. The pre-boot file transfer system of claim 2, wherein the client device is configured to:
store a second file offset value in a missing offset database, wherein the second file offset value is associated with the second location in the application buffer.

5. The pre-boot file transfer system of claim 4, wherein the client device is configured to:
receive an end of file indicator over the network from the server device, and in response, send a retransmission request for a second packet that is associated with the second file offset value over the network to the server device.

6. The pre-boot file transfer system of claim 1, wherein the client device is configured to:
write the plurality of packets that were stored in the receive buffer into the application buffer in response to determining that the receive buffer is full.

7. An information handling system (IHS), comprising:
a communication system that is configured to couple to a network;
a receive buffer that is coupled to the communication system;
an application buffer;
a processing system that is coupled to the receive buffer and the application buffer; and
a memory system that is coupled to the processing system and that includes instruction that, when executed by the processing system, cause the processing system to provide a payload assembling engine that is configured to:
receive a plurality of packets for a file through the communication system from the network in a pre-boot environment, wherein each of the plurality of packets includes a header with a respective file offset value stored therein that defines a position of a respective packet of the plurality of packets in a file offset order, and wherein the plurality of packets are received in an packet receive order that is different than the file offset order that is defined by the respective file offset values included in the plurality of packets;
store the plurality of packets in the receive buffer in the packet receive order in which the plurality of packets were received; and
write the plurality of packets that were stored in the receive buffer into the application buffer in the file offset order that is defined by the respective file offset values for the plurality of packets.

8. The IHS of claim 7, wherein the payload assembling engine is configured to:
write a first packet of the plurality of packets that was stored in the receive buffer into a first location in the application buffer according to a first file offset value for the first packet; and determine that a third packet of the plurality of packets that was received immediately subsequent to the first packet and stored in the receive buffer includes a third file offset value that indicates that the third packet is to be written to a third location in the application buffer that is separated from the first location in the application buffer by a second location in the application buffer and, in response, pad the second location in the application buffer.

9. The IHS of claim 8, wherein the payload assembling engine is configured to:
determine that a second packet that was that was received subsequent to the third packet and stored in the receive buffer includes a second file offset value that is associated with the second location in the application buffer and, in response, write the second packet into the second location in the application buffer.

10. The IHS of claim 8, wherein the payload assembling engine is configured to:
store a second file offset value in a missing offset database, wherein the second file offset value is associated with the second location in the application buffer.

11. The IHS of claim 10, wherein the payload assembling engine is configured to:
receive an end of file indicator through the communication system from the network, and in response, send a retransmission request for a second packet that is associated with the second file offset value through the communication system and over the network.

12. The IHS of claim 7, wherein the payload assembling engine is configured to:
write the plurality of packets that were stored in the receive buffer into the application buffer in response to determining that the receive buffer is full.

13. The IHS of claim 7, wherein the pre-boot environment is a Unified Extensible Firmware Interface (UEFI) pre-boot environment, and the file is an operating system (OS) image.

14. A method for transferring a file in a pre-boot environment, comprising:
receiving, by a client device in a pre-boot environment, a plurality of packets for a file through a network, wherein each of the plurality of packets includes a header with a respective file offset value stored therein that defines a position of a respective packet of the plurality of packets in a file offset order, and wherein the plurality of packets are received in a packet receive order that is different than the file offset order that is defined by the respective file offset values for the plurality of packets;
storing, by the client device in the pre-boot environment, the plurality of packets in a receive buffer in the packet receive order in which the plurality of packets were received; and
writing, by the client device in the pre-boot environment, the plurality of packets that were stored in the receive buffer into an application buffer in the file offset order that is defined by the respective file offset values for the plurality of packets.

15. The method of claim 14, further comprising:
writing, by the client device in the pre-boot environment, a first packet of the plurality of packets that was stored in the receive buffer into a first location in the application buffer according to a first file offset value for the first packet; and
determining, by the client device in the pre-boot environment, that a third packet of the plurality of packets that was received immediately subsequent to the first packet and stored in the receive buffer includes a third file offset value that indicates that the third packet is to be written to a third location in the application buffer that is separated from the first location in the application buffer by a second location in the application buffer and, in response, pad the second location in the application buffer.

16. The method of claim 15, further comprising:
determining, by the client device in the pre-boot environment, that a second packet that was that was received subsequent to the third packet and stored in the receive buffer includes a second file offset value that is associated with the second location in the application buffer and, in response, writing the second packet into the second location in the application buffer.

17. The method of claim 15, further comprising:
storing, by the client device in the pre-boot environment, a second file offset value in a missing offset database, wherein the second file offset value is associated with the second location in the application buffer.

18. The method of claim 17, further comprising:
receiving, by the client device in the pre-boot environment, an end of file indicator over the network, and in response, sending a retransmission request for a second packet that is associated with the second file offset value over the network.

19. The method of claim 14, further comprising:
writing, by the client device in the pre-boot environment, the plurality of packets that were stored in the receive buffer into the application buffer in response to determining that the receive buffer is full.

20. The method of claim 14, wherein the pre-boot environment is a Unified Extensible Firmware Interface (UEFI) pre-boot environment, and the file is an operating system (OS) image.

* * * * *